United States Patent [19]

Erickson

[11] 4,216,199
[45] Aug. 5, 1980

[54] HYDROGEN PRODUCTION FROM CARBONACEOUS FUELS USING INTERMEDIATE OXIDATION-REDUCTION

[76] Inventor: Donald C. Erickson, 1704 S. Harbor La., Annapolis, Md. 21401

[21] Appl. No.: 560,341

[22] Filed: Mar. 21, 1975

[51] Int. Cl.² .............................................. C01B 1/08
[52] U.S. Cl. .................................................... 423/657
[58] Field of Search .................................. 423/657, 437

[56] References Cited

U.S. PATENT DOCUMENTS

| 3,017,250 | 1/1962 | Watkins | 423/657 |
| 3,821,362 | 6/1974 | Spacil | 423/657 |
| 3,859,373 | 1/1975 | Seitzer | 423/657 |
| 3,880,987 | 4/1975 | Nahas | 423/657 |
| 3,928,550 | 12/1975 | Seitzer | 423/657 |

Primary Examiner—O. R. Vertiz
Assistant Examiner—Wayne A. Langel

[57] ABSTRACT

A slurry of either pure or dissolved liquid metal and its oxide is oxidized by steam to produce hydrogen, and then regenerated to its original composition by a reducing gas. The liquid metal can be tin, indium, or several others. The slurry approach makes greatly simplified operation in either the batch or continuous mode possible, and allows the all-important equilibrium point of the two reactions to be controlled independently of temperature. The mode of operation is further defined in order to achieve desirable process temperature conditions with adiabatic operation.

15 Claims, 2 Drawing Figures

019
HYDROGEN PRODUCTION FROM CARBONACEOUS FUELS USING INTERMEDIATE OXIDATION-REDUCTION

BACKGROUND OF THE INVENTION

The field of art of this invention is the one encompassing processes in which hydrogen is produced in elemental form by a chemical reaction between water in any state and a metal or metallic compound. The field is further defined in that the metal or metallic compound which is consumed (i.e. oxidized) in the above reaction is regenerated by reaction with a carbonaceous reducing composition. Thus this field is distinguished from thermochemical processes and from processes in which the metal is regenerated electrolytically. The field is further defined in that the metal or metallic compound is in liquid phase in either pure or dissolved form at process conditions.

Typical prior art related to this field of invention is described in U.S. Pat. Nos. 1,050,902 and 3,821,362.

Some of the problems existing in the prior art practice of this field of invention are as follows. In one prior art process using a liquid phase metal, that metal, tin, is present strictly in pure form. The process is continuous, with the reduction and oxidation reactions occurring at physically separate regions. Care is taken that only $SnO_2$ is removed from the oxidation region and transported to the reduction region, and that only tin is removed from the reduction region and transported back to the oxidation region. This requires either an excess of steam in the oxidation region to ensure formation of powdered $SnO_2$, plus the difficulty of transporting a powder, or the inclusion of a molten salt or molten oxide of another metal in the process which will float on the tin and in which the $SnO_2$ will become either dissolved or suspended. The prior art teachings of this process also require a costly external supply of heat, either electricity or a separate furnace in heat exchange relation with the reaction regions. An excessive loss of tin has also been experienced during operation. The equilibrium points of the two reactions, which determine the degree of steam conversion to hydrogen obtainable, are determined by temperature, and the temperature is constrained by other factors such as reaction rate and cost of external heating, resulting in very limited control of reaction equilibrium being possible. This is representative of deficiencies in prior art processes for production of hydrogen.

OBJECTS OF THE INVENTION

It is therefore a general object of this invention to obtain elemental hydrogen efficiently by a chemical reaction process. A further object of the invention is to obtain elemental hydrogen in a chemical reaction process involving the reduction of $H_2O$ wherein the extent of $H_2O$ conversion to hydrogen can be varied independently of temperature. Another object of the invention is to improve the materials transport efficiency in reaction processes producing elemental hydrogen.

More specific objects of this invention are to increase the yield of hydrogen obtainable from a given quantity of carbonaceous reducing composition; to eliminate or minimize the difficulties which arise in the continuous mode of operation from transporting a liquid intermediate and its oxide between the respective oxidation and reduction regions, or from separating them; to make possible a batch mode of operation in which no separation or transport whatever of the liquid intermediate and its oxide is required; to enable the equilibrium point of the respective oxidation and reduction reactions to be adjusted and regulated independently of temperature; to eliminate the need for an external supply of high temperature thermal energy to the process while maintaining desirable operating conditions; and to minimize the loss of liquid intermediate in the process.

SUMMARY OF THE INVENTION

These and other beneficial effects are achieved as follows. A properly proportioned slurry is formed from a liquid intermediate and its stable oxide. The slurry is subjected to the respective oxidation and reduction reactions, and in the continuous mode the slurry is transported between the oxidation and reduction regions. Either tin or indium will serve as a pure liquid intermediate. In one embodiment of the invention, a carefully selected and proportioned solvent for a liquid intermediate is used to form a slurry containing the dissolved liquid intermediate and its oxide in finely divided form. By controlling the proportion of dissolved intermediate in the solution, the equilibrium point of the oxidation and reduction reactions can be varied independently of temperature. Tin, indium, germanium, zinc, and gallium will serve as dissolved liquid intermediates; the solvents are generally selected from copper, tin, lead, and bismuth. In another aspect of the invention, the desirable operating condition of having the reduction region temperature equal or exceed the oxidation region temperature is achieved in the absence of external heating by introducing the steam at a temperature cold enough to remove the exothermic oxidation reaction heat, and introducing the reducing gas hot enough to supply both the endothermic reaction heat of the reduction reaction and the thermal losses.

THERMODYNAMIC BACKGROUND OF THE INVENTION

Figure 1:
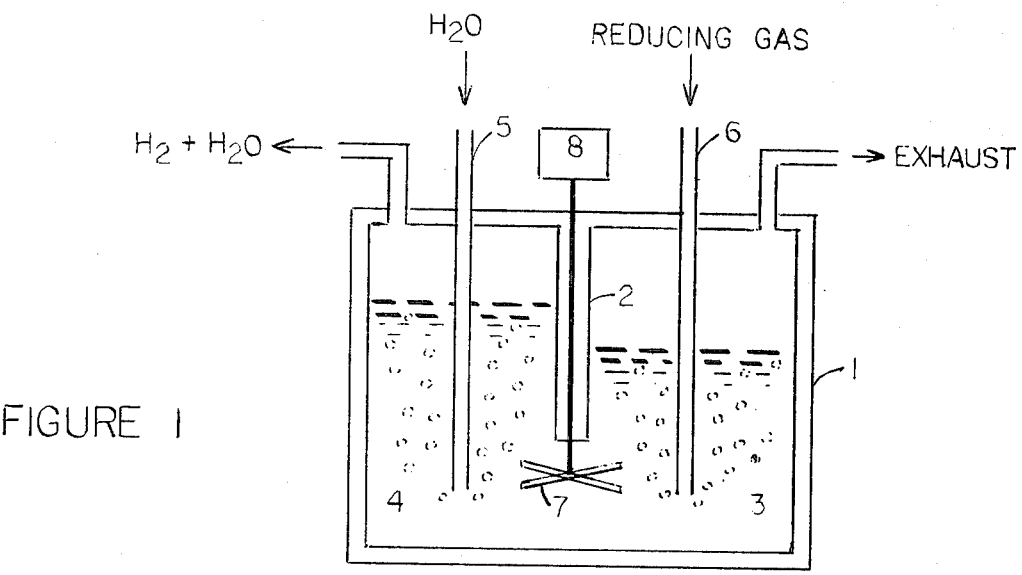
FIG. 1 is a schematic sketch of a single container divided into separate reaction regions by a baffle, and containing a slurry which is internally transported between the two reaction regions.

The process of this invention consists essentially of a double exchange of chemically bound oxygen. First it is exchanged between $H_2O$ and the metal or metallic compound, forming hydrogen and an oxide of the metal or metallic compound. Then the chemically bound oxygen is exchanged between the oxide and a reducing gas containing CO and $H_2$, forming the original metal or metallic compound while oxidizing the $H_2$ and CO to $H_2O$ and $CO_2$. The metal or metallic compound is not consumed, but is strictly an intermediate, it being oxidized in the first reaction and the oxide being reduced in the second. Thus the net overall reaction is $H_2O$ plus reducing gas reacting to hydrogen plus exhaust, with the very important side effect that impurities in the reducing gas are not introduced into the hydrogen.

The thermodynamics governing this process is set forth in chapters 10, 11, and 13 of *Introduction to Metal-*

*lurgical Thermodynamics* by D. R. Gaskell, Mcgraw-Hill, 1973.

The general form of the oxidation reaction applicable to all metals or metallic compounds is given by $$xM + yH_2O = M_xO_y + yH_2$$

where M represents the metal or metallic compound, and $M_xO_y$ is its oxide having minimum free energy, i.e. its stable oxide, at the process conditions. The equilibrium point of this reaction is given by $$K_p = e^{\frac{-\Delta G}{RT}} = \frac{(pH_2)^y a(M_xO_y)}{(pH_2O)^y [a(M)]^x}$$

where $K_p$ is the constant pressure equilibrium constant
$a(Z)$ is the chemical activity of species Z
$pZ$ is the partial pressure of gaseous species Z in atmospheres,
$\Delta G$ is the standard free energy change of the reaction in kcal/mol $M_xO_y$, and
T is the reaction temperature in degrees Kelvin.

The species which are present only in the gaseous phase are $H_2$ and $H_2O$. The expression for their concentrations at equilibrium when $a(M_xO_y)$ equals unity is given by $$pH_2/pH_2O = [[a(M)]^x K_p]^{1/y}$$

Consider first the case in which both M and $M_xO_y$ are present at essentially unit activity, i.e. as pure substances. In that case the equilibrium gas composition is determined completely by $\Delta G$ and T. Since $\Delta G$ is determined uniquely by the identities of M and $M_xO_y$, once they are fixed the equilibrium $pH_2/pH_2O$ value is determined uniquely by the temperature. No matter what the initial composition or pressure of the gas which is brought into contact with M and $M_xO_y$, i.e. whether pure $H_2$, pure steam, any mixture of the two, or containing any amount of nonreacting impurities, the gas will react until that unique ratio is established at equilibrium. This is true regardless of the amount of either M or $M_xO_y$ which is present, provided only that some amount of each however small is present in the pure state at equilibrium.

If either M or $M_xO_y$ is present at reduced activity, i.e. in solution, then the above expression shows that $pH_2/pH_2O$ equilibrium values different from the unique one applicable to the pure substances at a given temperature are obtainable. With M at reduced activity, smaller values of $pH_2/pH_2O$ can be obtained, whereas with $M_xO_y$ in solution, larger values can be obtained.

The activity of a component in an ideal solution is given by its mol fraction. The activity coefficient expresses the deviation from ideal behavior. For all solutions, the solution becomes more ideal as the temperature is increased, and activities of components with large mol fractions are always close to the ideal value.

In the reduction reaction step of this process, in which $M_xO_y$ is reacted with reducing gas, two reactions generally occur. One is the above reaction in the reverse direction, wherein the hydrogen content of the reducing gas reacts with $M_xO_y$ to produce M. That reaction equilibrium is determined by the same $pH_2/pH_2O$ value as above, which for pure substances is a function only of temperature. The other reaction is $$M_xO_y + yCO = xM + yCO_2$$

for which the equilibrium constant is $$K_p = e^{\frac{-\Delta G}{RT}} = \frac{(pCO_2)^y}{(pCO)^y} \cdot \frac{[a(M)]^x}{a(M_xO_y)}$$

Once again, for pure substances the equilibrium $pCO/pCO_2$ value is uniquely determined by the temperature, but other values can be obtained at the same temperature by using solution thermodynamics.

Accordingly when reducing gas containing CO and $H_2$ is brought into contact with $M_xO_y$, the $M_xO_y$ is reduced to M as the CO and $H_2$ are oxidized to $CO_2$ and $H_2O$ until the equilibrium values of $pCO/pCO_2$ and $pH_2/pH_2O$ are achieved. No further conversion of CO and $H_2$ will take place, i.e. a certain amount of unburned CO and $H_2$ determined by process equilibrium will unavoidably be present in the exhaust gas. Neither the oxidation reaction with steam or the reduction reaction with reducing gas can be quantitative, for they are both governed by the same equilibrium. In other words, when the oxidation and reduction reactions are conducted with the same pure substances and at the same temperature, then if 35% conversion of steam to hydrogen is achieved, it will necessarily be impossible to use more than 65% of the hydrogen in the reducing gas for reduction.

The precise equilibrium values of $pH_2/pH_2O$ and $pCO/pCO_2$ for different pure substances at different temperatures can be read directly from an Ellingham diagram with Richardson nomograms, as for example on page 269 of Gaskell. Note that the two ratios are always equal at 1092° K., which makes that a particularly good temperature to cite in illustrative examples. Also, the values of both ratios decrease with increasing temperature.

The fact that both reactions tend toward the same equilibrium point is significant. It means that not all the steam will be converted to hydrogen, and that not all the hydrogen in the reducing gas will be utilized. It also means that the equilibrium value defines the maximum degree of steam conversion attainable. The amount of steam injected into the oxidation reaction region but not converted to hydrogen represents a loss of thermal energy to the process, and the amount of $H_2$ and CO of of the reducing gas not utilized represents a loss of chemical chemical energy to the process. Therefore neither steam nor reducing gas should be supplied to the process "in excess", as that would be seriously wasteful and uneconomic. It is important to achieve substantially complete equilibrium in both the oxidation and reduction reactions.

The thermodynamic heating effects of the respective oxidation and reduction reactions are also important to consider. This is so because the reactions occur at elevated temperatures (typically 800° K. to 1300° K.), and it is quite expensive to supply heat from an external source at those temperatures. The oxidation reaction is always exothermic, although the degree of exothermicity varies with choice of M. Correspondingly, the reduction reaction with CO is generally endothermic, although substantially less so than with hydrogen.

It can be seen that equilibrium considerations make it desirable to conduct the reduction reactions at a higher temperature than the oxidation reaction, in order to simultaneously increase the proportion of steam converted to hydrogen and the proportion of reducing gas utilized for chemical reduction. However the reaction heat effect of the process is just the opposite—it tends to heat up the oxidation region and cool down the reduction region.

In light of the preceding summary of thermodynamic characteristics of the process of this invention, it is now possible to define several terms which will simplify the subsequent discussion including the claims.

A "nongaseous intermediate capable of exchanging chemically bound oxygen with $H_2O$ and $CO_2$" is defined as a nongaseous species of matter, which satisfies two criteria at some temperature in the temperature range 700° K. to 1300° K.: first, that when it is contacted with steam at some pressure in the range of 1 to 500 atmospheres, some of the nongaseous intermediate will acquire chemically bound oxygen from the $H_2O$ by being oxidized and reducing some of the $H_2O$ to hydrogen, and the equilibrium $pH_2/pH_2O$ value which results if equilibrium is allowed to be established is greater than 0.05; and second, that when the oxidized nongaseous intermediate so formed is contacted with a gas, which is at a pressure in the range of 1 to 50 atmospheres and which contains CO and $H_2$ in any proportions and which has a $pH_2/pH_2O$ greater than the equilibrium $pH_2/pH_2O$ value referred to above and less than 10, the CO and $H_2$ of the gas will acquire chemically bound oxygen from the oxidized intermediate thereby reducing it to the original nongaseous intermediate and oxidizing some of the CO and $H_2$ to $CO_2$ and $H_2O$. This term frequently will be abbreviated to "nongaseous intermediate". When appropriate, more particular descriptors such as "solid", "pure liquid", or "dissolved liquid" will be used in place of "nongaseous".

The thrust of the definition is that both reactions occur at least to a reasonable extent, e.g. at least 5% conversion of steam to $H_2$, and at least approximately a similar amount of the reducing gas be utilized for reduction. This immediately eliminates a great number of metals and metallic compounds. For example, aluminum, magnesium, sodium, lithium, barium, and calcium will all react with $H_2O$ until much greater than 99% conversion of steam to $H_2$ is obtained, but they cannot be reduced by reducing gas—a reducing gas containing 1% $CO_2$ or $H_2O$ would actually oxidize these metals. This is because these metals all have a substantially greater affinity for $O_2$ than does $H_2$. On the other side are metals such as copper, lead, bismuth, nickel, and mercury. The oxides of all of these metals are readily reduced by reducing gas, making essentially complete utilization of all the chemical energy of the reducing gas, but none of them will convert anywhere near even 1% of $H_2O$ to hydrogen. They all have substantially less affinity for $O_2$ than does $H_2$.

Of the few metals and metallic compounds whose affinity for $O_2$ is sufficiently close to that of $H_2$ to yield the necessary $pH_2/pH_2O$ equilibrium, the second part of the definition eliminates several more. Since the oxide must be reducible by a gas containing CO and $CO_2$, this precludes those oxides having strong affinity for $CO_2$, thereby forming carbonates. In particular this eliminates cesium, rubidium, and potassium.

The reducing agent employed in the reduction reaction is generally a reducing gas; i.e. a gas containing CO and $H_2$ in concentrations such that their proportions to $CO_2$ and $H_2O$ are respectively greater than the equilibrium $pH_2/pH_2O$ and $pCO/pCO_2$ values characteristic of the particular nongaseous intermediate used. Such a gas can be prepared by the partial oxidation of any carbonaceous feedstock in air or pure oxygen, and normally with some steam also, using means known to the art. It is known to mix additional carbonaceous feedstock directly into the reducing gas. It is also known to introduce the carbonaceous feedstock directly into the reduction reaction region. This is preferably done jointly with air or oxygen introduction also, plus possibly some steam, as otherwise the reaction will require excessive amounts of heat from an external source. It is also preferable when the more valuable nongaseous intermediates are used and the feedstock is introduced directly that the feedstock be a clean gas, distillate, or filtrate, such as natural gas, refined oils, or solvent-refined coal, to preclude introducing excessive inorganic material into the nongaseous intermediate. The term "carbonaceous reducing composition" is used to encompass all of the above possibilities, and can normally be thought of as reducing gas.

A slurry is defined as a mixture of one or more liquid phase substances and one or more solid phase substances which do not dissolve in the liquid phase substances wherein the solid phase substances are present in finely divided form and dispersed throughout the bulk of the liquid whereby the mixture has the flow and transport qualities of a liquid and the mixture forms a well defined boundary with a gas.

DESCRIPTION OF THE PREFERRED EMBODIMENTS

In one embodiment this invention involves combining a pure liquid intermediate with the stable oxide of the intermediate in finely divided form into a slurry, and subjecting that slurry to the oxidation and reduction steps of the process, plus also the transporting steps if required. The slurry composition changes as it undergoes the respective chemical reactions, the liquid intermediate content increasing in reduction and decreasing in oxidation. The proportion of the slurry which is oxide should not decrease below approximately 0.03, in order to ensure that sufficient oxide is present to support the reduction reaction, and the mol fraction of the liquid intermediate should not decrease below approximately 0.5 and preferably 0.65 in order to retain the fluid characteristics of the slurry.

Control over slurry composition in the continuous mode of operation is effected by regulating the rates of steam introduction to the oxidation region and reducing gas introduction to the reduction region, and by regulating the rate of transport of the slurry between the respective reaction regions. Consider for example a reference steady state condition wherein the temperatures of both reaction regions are fixed and the steam and reducing gas are being injected at steady rates such that the rate at which liquid intermediate is being oxidized in the oxidation region equals the rate at which it is being produced by reduction of oxide in the reduction region. The slurry composition of each region will be constant, and the oxide content of the portion of slurry in the oxidation region will necessarily be higher than in the reduction region. If the flow rates of both gases are increased but maintained in the same proportions, the difference in slurry composition between the two regions will increase. If the rate of slurry transport is increased the slurry composition difference will decrease. If the rate of steam addition is decreased temporarily, and then resumed at the previous rate, the oxide content of both regions will decrease but the difference will remain the same. The same effect is achievable by temporarily increasing the rate of reducing gas flow.

The slurry can be initially established by starting with pure liquid intermediate only, and conducting only the oxidation reaction until the desired proportions are obtained.

Two substances which are suitable for the practice of this invention as pure liquid intermediates combined in a slurry with their oxides are tin and indium. Pure tin without a catalyst requires temperatures of approximately 1050° K. or higher in both reaction regions in order to achieve acceptably rapid reaction rates. Indium achieves acceptable reaction rates at temperatures approximately 150° K. lower than tin. The stable oxide of tin at process conditions is $SnO_2$, and that of indium is $In_2O_3$.

There are various reasons why the prior art would not have anticipated this slurry approach, or would not have expected it to work. First, the oxide content could agglomerate into excessively large, coherent lumps, which would neither flow nor react. This turns out not to happen with $SnO_2$ in Sn or with $In_2O_3$ in In. Secondly, it could be difficult to maintain the slurry formed i.e. prevent it from separating, as for example by gravity. With both tin and indium, the specific gravity of the oxide is close enough to that of the liquid metal that this is no problem. Thirdly, the intermediate and oxide might become appreciably dissolved in one another, altering the delicate balance of activities which determine the equilibrium point of each reaction. Again tin and indium do not suffer on this account. Finally a slurry approach greatly slows down the reaction rate compared to one in which the liquid intermediate is atomized, owing to the greatly reduced gas-liquid contact area available. A straight forward slurry approach, wherein the gaseous reactant is injected directly into the body of the slurry as for example through tuyeres, lances, nozzles, etc., requires an oxidation region temperature some 50° K. higher than when atomization is used for similar reaction rates. This temperature difference can be reduced somewhat by utilizing a coarse spray device which the solids content of the slurry will not clog, or by using other known means of increasing either contact area or time: gas recirculation, increased bed heights, etc. Bed heights of slurry which are contemplated are in the approximate range of 0.5 to 15 meters.

The equilibrium $pH_2/pH_2O$ values for these two pure intermediates vary by roughly a factor of 10: at 1050° K., it is 4.0 for the $In-In_2O_3$ slurry (i.e. 80% conversion of steam to hydrogen) and 0.41 for the $Sn-SnO_2$ combination (29% conversion of steam to hydrogen). The very low utilization of reducing gas achieved by the indium slurry suggests that it would find use only in combination with some further economical use of the slightly depleted reducing gas which is its exhaust. On the other hand, the tin slurry achieves better reducing gas utilization than does the steam-iron process, giving it an important thermodynamic advantage over that process in addition to the advantages of requiring substantially simpler process equipment and producing a purer hydrogen product. The somewhat lower steam conversion achieved by the tin slurry compared to steam-iron represents a much smaller energy loss to the system than does unutilized reducing gas. In some applications, a high steam content in the hydrogen is actually desirable; in other cases it is separated out using known techniques such as condensation.

A major consideration in both the tin and indium processes is the gaseous suboxide of the intermediate which is formed and is present in all exiting gas streams. It is formed in both the oxidation and reduction reactions, and its partial pressure varies exponentially with temperature. Since neither the oxidation nor reduction reaction equilibrium is affected by pressure, operating both reactions at higher pressures such as up to approximately 500 atmospheres will proportionately reduce the loss of intermediate. For example, when the tin slurry is oxidized at 1075° K. and reduced at 1150° K. and both reactions are conducted at 2 atmospheres, the value of tin present as SnO in the exhaust gas approximates the cost of the fuel used to produce the reducing gas. The loss on the hydrogen side is only one tenth as large due to the lower temperature. If the pressure of both reactions is increased to 20 atmospheres, then only one tenth as much tin is lost per weight of fuel reacted or hydrogen generated. Thus operation at 2 atmospheres must have highly efficient exhaust gas treatment systems to recover SnO in order to be economically feasible, whereas they are optional for higher pressure operation. Similar considerations apply to gaseous sulfides of the intermediates when the carbonaceous feedstock contains sulfur.

In a second embodiment, this invention involves forming a slurry containing a nongaseous intermediate in liquid solution, a carefully selected solvent, and the stable oxide of the dissolved liquid intermediate in finely divided form. This slurry is processed similarly to the pure liquid slurry of the first embodiment. The significant difference is that the equilibrium point of both the oxidation and reduction reactions can be varied while holding temperature constant by changing the solution proportions, i.e. by varying the activity of the dissolved intermediate.

The solvent must meet the physical criterion of forming the desired solution in the desired temperature range, and must satisfy the thermodynamic criterion that its affinity for oxygen must be less than that of the dissolved liquid intermediate—otherwise it would be oxidized by steam in preference to the intermediate. It should not appreciably dissolve the oxide of the intermediate; it should meet reasonable criteria of cost and low vapor pressure; and it should not form complicating species such as carbonates, nitrides, hydroxides, etc. excessively under process conditions. Copper, lead, and bismuth, or mixtures thereof have been found to be acceptable solvents for tin; and all of them plus tin are acceptable solvents for indium.

The net effect of incorporating a solvent is to lower the equilibrium $pH_2/pH_2O$ value. Therefore some substances which do not satisfy the definition of a nongaseous intermediate because their equilibrium $pH_2/pH_2O$ values are a little too large when they are in the pure state can meet the definition when they are dissolved. Zinc and also gallium fall in this category.

Consider a liquid solution containing 20 atom percent (a/o) indium and 80 a/o tin, at 1050° K. The activity of the indium is approximately 0.2, meaning that its equilibrium $pH_2/pH_2O$ value is decreased from the pure indium value, 4.0, to 1.2. When steam is contacted with this solution, some $In_2O_3$ will form, which will decrease the atom percent of indium in solution, which will cause the equilibrium $pH_2/pH_2O$ value to further decrease. When the solution containing $In_2O_3$ is contacted with reducing gas, the opposite occurs. Thus not only does the slurry composition vary between oxidation and reduction stages, as in the case of pure slurries, but the equilibrium $pH_2/pH_2O$ value also varies even when both reaction temperatures are the same. Control over slurry composition is exercised through the variables steam flow rate, reducing gas flow rate, and slurry transport rate, just as in the case of pure intermediate slurries. However control is more complex because the amount of steam necessary to oxidize a given amount of the intermediate, and the amount of reducing gas necessary to reduce a given amount of oxide, varies with slurry composition. As with the pure substance slurry, the mol fraction of solids in the solution slurry should not exceed approximately 0.4.

Now consider a solution containing 4 a/o indium and 96 a/o tin at 1050° K. The equilibrium $pH_2/pH_2O$ value for the indium is 0.4 at this activity, the same as that for the tin! When steam is contacted with this solution, both substances will be oxidized, forming $SnO_2$ and $In_2O_3$. However, 24 atoms of Sn will be oxidized for every atom of In oxidized, in order to keep the solution proportions such that both species have equal oxygen affinity. This is in essence a catalytic effect—the tin is undergoing most of the reaction, but the presence of indium, which reacts at substantially lower temperatures, at conditions of equal oxygen affinity as the tin causes the tin to react at lower temperatures. Indeed, there probably is direct oxygen exchange between the tin and indium independent of the presence of $H_2$ or CO.

Note that if the solution does not initially have exactly the correct proportions at which the oxygen affinities of the two species are equal, that proportion will automatically be obtained by the selective oxidation (and removal from solution) of the intermediate having greater oxygen affinity.

One problem of semantics arises. Clearly a solution containing 50 a/o copper, 48 a/o tin, and approximately 2 a/o indium in the liquid phase is classed as a dissolved liquid intermediate with two active species. But what about a solution containing 96 a/o tin and approximately 4 a/o indium in the liquid phase? Is it a catalyzed pure liquid intermediate or a dissolved liquid intermediate with two active species? For the purposes of this specification, the former terminology is adopted.

Zinc is a particularly good intermediate to be added in dissolved form to other intermediates in order to lower their reaction temperatures. Zinc reacts readily with steam at temperatures of 700° K. or higher. Typically approximately 5 a/o zinc is added to another dissolved or pure liquid intermediate, e.g. tin, indium, or germanium. Due to the high oxygen affinity of zinc, most of it will oxidize and be present in the slurry as ZnO. However the small fraction of a percent of dissolved zinc remaining, at equal oxygen affinity as the other intermediate, exerts a powerful catalytic effect. The lower temperature operation made possible not only conserves process thermal energy, but perhaps more importantly decreases the loss of intermediate as vapor.

The steam supplied to the oxidation region is not precluded from having some hydrogen content, provided it does not exceed the equilibrium $pH_2/pH_2O$ value. Of course any hydrogen content will decrease the proportion of steam converted to hydrogen. Other impurities in the steam are not desirable, as they will be carried into the product hydrogen.

Although the essential feature of the slurry of this specification is that the solid phase remain finely dispersed throughout the liquid phase, it does not have to be equally dispersed. Most of the liquid solvents are heavier than the intermediate oxides, and therefore the proportion of oxide will tend to be greater in the higher elevation parts of dissolved intermediate slurries. This is acceptable as long as at least some of both the liquid and solid phase is present in each reaction region.

There are various modifications, refinements, or improvements possible to the two categories of embodiments just described. Most of these will be apparent to those skilled in the art: the employment of regenerative heat exchange between various process streams to improve thermal efficiency; utilization of the chemical energy of the exhaust in various advantageous ways, etc. Three modifications which are applicable to either type of embodiment are made explicit in the remaining sections: the means of slurry transport available during continuous operation, the possible advantages of batch operation, and means of adiabatic temperature control.

In the continuous mode of operation, in which the oxidation and reduction reactions occur simultaneously, the reactions must be conducted in physically separated regions in order to prevent the product gases from mixing. Accordingly the slurry must be transported between the two regions. This is accomplished most simply when the two regions are contiguous zones of a common container, and the gas space above the two regions is divided by a baffle as shown in FIG. 1. In that figure, 1 is the container and 2 is the baffle, 4 is the oxidation region or zone, and 3 is the reduction region. Lances 5 and 6 inject the gaseous reactants into the respective slurry containing zones. The transport of slurry is accomplished by diffusion action and the turbulence caused by the injected gases, and can optionally be supplemented by a stirrer or other agitation means, as for example the stirrer 7 driven by motor 8.

Figure 2:
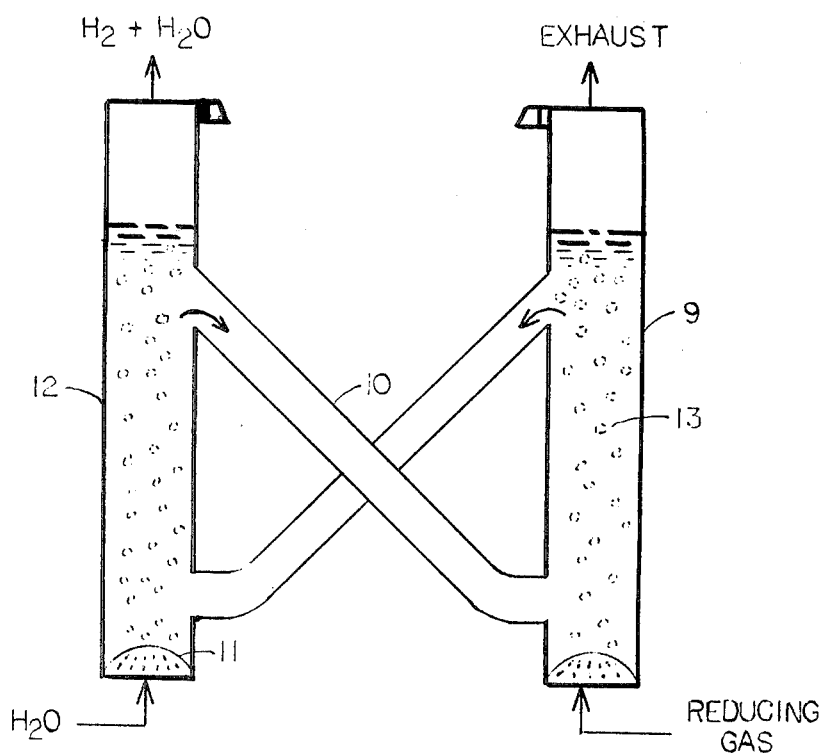
FIG. 2 is an alternative arrangement sketch illustrating the embodiment in which the two reaction regions are located in separate containers and the slurry is transported between containers by the gas lift effect.

When greater physical separation between the reaction regions exists, as for example when they are in separate containers, more overt means of slurry transportation is necessary. This could be via known types of pumps, such as electromagnetic pumps. One preferable approach is to cause the slurry to circulate between regions by transferring momentum to it from the gaseous reactants and products. This could be done by jetting the gaseous reactants into the slurry at high velocity and at an angle. An example of this is described in the article 'The Gasification of Coal in an Experimental Rummel Double-Shaft Slag-Bath Gasifier' in the May 1965 *I.G.E. Journal*. It could also be done by the gas lift principle, wherein the momentum of the gas phase is obtained by gravity rise through the slurry, as shown in FIG. 2. In that figure, container 12 is the oxidation region and container 9 is the reduction region. The rising gas bubbles 13 which originate at nozzle plates 11 impart their momentum to the slurry, which is transported between the respective reaction regions by conduits 10.

Those processes in which the oxidation and reduction reactions are not conducted simultaneously, but are conducted during different and nonoverlapping time intervals, are termed batch. One advantage of batch operation is that the two reactions can be conducted in the same location or region, i.e. there is no need to transport the slurry at all. Without the slurry approach, the batch mode of operation would require complex means for separating the nongaseous reactants. One disadvantage of the batch approach is that residual exhaust gas from the reducing reaction normally has to be purged at the beginning of the oxidation reaction. It is known in the art to conduct two or more batch operations simultaneously, such that at least one batch operation is always undergoing reduction and another is always undergoing oxidation. In that way, the gaseous reactants, reducing gas and steam, can be produced steadily at a constant rate, and also the hydrogen product is produced steadily without interruption.

As is pointed out is U.S. Pat. No. 3,442,620, it is desirable from equilibrium considerations to operate the oxidation reaction at a lower temperature than the reduction reaction, and it is also desirable to operate adiabatically. In a continuous process, in order to maintain the reduction temperature higher than the oxidation temperature, three heat loads in the reduction region must be satisfied. These are the endothermic reaction heat, the heat necessary to raise the nongaseous reactant temperatures from oxidation temperature to reduction temperature, and the thermal losses to the environment. Since substantially more of the nongaseous reactants circulate than actually undergo reaction, they represent a substantial heat load, particularly for large temperature differences. In order to operate adiabatically, the reducing gas should be introduced into the reduction region at a temperature higher than the reduction region temperature, in order that its excess thermal energy supply the three heat loads mentioned. Reducing gas is typically generated at temperatures in the range of 1400° K. to 1600° K. or higher, so a substantial amount of excess thermal energy is available to be used.

On the oxidation side, the only heat load is the thermal loss, whereas the reaction heat and the excess reactant thermal heat are heat surpluses; the steam (or steam-water mixture) is conveniently supplied at a cooler temperature to remove the surplus heat.

The preceding technique for adiabatic operation at desirable process temperature conditions finds application also in batch operation.

The temperature difference between the reduction region and oxidation region in continuous processes can be further increased by incorporating a counterflow regenerative heat exchanger which transfers heat from the slurry enroute to the oxidation region to the slurry enroute to the reduction region.

By using the slurry approach, high pressure hydrogen can conveniently by generated in a continuous process by injecting the slurry into a high pressure oxidation region, where high pressure steam is reacted to high pressure hydrogen, and controllably removing the slurry from the high pressure region through a pressure restriction device in order to accomplish low pressure regeneration by reduction.

At temperatures below 1300° K., up to approximately 20 a/o iron will dissolve in antimony, making iron another possible choice of dissolved liquid intermediate.

I claim:

1. A process for generating hydrogen from $H_2O$ and a carbonaceous reducing composition which comprises
   a. establishing a slurry which contains
      1. a nongaseous intermediate and
      2. an oxide of the nongaseous intermediate,
   b. contacting the slurry with steam, whereby a gaseous mixture of hydrogen and $H_2O$ is formed, and the proportion of oxide of the nongaseous intermediate in the slurry is increased,
   c. removing the hydrogen, and
   d. contacting the slurry with the carbonaceous reducing composition, whereby the proportion of oxide of the nongaseous intermediate in the slurry is descreased, wherein the slurry temperature is maintained in the approximate range of 700° K. to 1300° K. and the slurry pressure is maintained in the approximate range of 1 to 500 atmospheres.

2. The process of claim 1 wherein the nongaseous intermediate is present in liquid solution and the solvent for the dissolved nongaseous intermediate has a lesser equilibrium $pH_2/pH_2O$ value at process conditions than does the nongaseous intermediate.

3. The process of claim 2 wherein the nongaseous intermediate is dissolved tin and the solvent is copper, lead, bismuth, or mixtures thereof.

4. The process of claim 1 wherein the mol fraction of liquid phase constituents of the slurry is maintained above approximately 0.5 and the mol fraction of solid intermediate oxide in the slurry is maintained above approximately 0.03.

5. The process of claim 4 wherein the mol fractions of liquid and solid phase constituents of the slurry are controlled by controlling the rate of transport of the slurry and the rates of introducing $H_2O$ and carbonaceous reducing composition in the respective contacting steps.

6. The process of claim 2 wherein the nongaseous intermediate is a dissolved liquid intermediate indium; and the solvent is composed of substances selected from the list tin, copper, lead, and bismuth.

7. The process of claim 1 wherein the two contacting steps are performed at physically separate locations within at least one container, and wherein the motive force for transport of the slurry from one location to the other is derived from a transfer of momentum from the gas phase reactants to the slurry.

8. The process of claim 1 wherein the carbonaceous reducing composition is a reducing gas; and wherein the first contacting step, with $H_2O$, is performed at a lower temperature than the second contacting step, with the reducing gas; and wherein the reducing gas is supplied to the second contacting step at a temperature of 100° K. to 500° K. higher than the temperature of the second step, and the $H_2O$ is supplied to the first contacting step at a temperature colder than the temperature of the first step.

9. The process of claim 1 wherein the nongaseous intermediate is liquid tin, both of the contacting steps are performed at temperatures greater than 1025° K. and less than 1250° K., and at pressures greater than 5 atmospheres, and the temperature of the first contacting step is from 0° K. to 100° K. colder than the temperature of the second contacting step.

10. The process of claim 1 wherein the step of contacting the slurry with $H_2O$ is performed at a pressure at least approximately 20 atmospheres greater than the pressure at which the step of contacting the slurry with carbonaceous reducing composition is performed.

11. The process of claim 1 wherein the intermediate is a dissolved liquid, and the equilibrium $pH_2/pH_2O$ value is controlled by controlling the proportion of intermediate in solution, whereby the equilibrium $pH_2/pH_2O$ value can be controlled independently of temperature.

12. The process according to claim 1 wherein the carbonaceous reducing composition is a reducing gas essentially containing CO and $H_2$.

13. The process according to claim 1 wherein the carbonaceous reducing composition consists essentially of a mixture of gas phase hydrocarbons and air, optionally admixed with steam.

14. The process of claim 1 wherein the nongaseous intermediate is tin.

15. In a process for producing hydrogen from a carbonaceous reducing composition and steam by contacting a liquid phase nongaseous intermediate with steam, producing thereby hydrogen and an oxide of the nongaseous intermediate, and by contacting the nongaseous intermediate oxide with the carbonaceous reducing composition to thereby regenerate the nongaseous intermediate, the improvement which comprises combining the nongaseous intermediate and the nongaseous intermediate oxide into a slurry and subjecting the slurry to the respective contacting actions.

* * * * *